Nov. 4, 1941.    L. G. PIMBLETT    2,261,524
APPARATUS FOR SCREENING PROJECTED FILM PICTURES
Filed Oct. 26, 1939

Inventor:
L. G. Pimblett,
By
C. T. Wendroth
Atty

Patented Nov. 4, 1941

2,261,524

UNITED STATES PATENT OFFICE 2,261,524

APPARATUS FOR SCREENING PROJECTED FILM PICTURES

Lewis George Pimblett, Sydney, New South Wales, Australia

Application October 26, 1939, Serial No. 301,475
In Australia December 3, 1938

1 Claim. (Cl. 88—24)

In conventional practice, transparency and film pictures (positive) are projected onto a viewing screen whereon the pictures are defined or materialised and may then be viewed either by diffuse reflection from the screen, or by light transmission and diffusion through it.

This invention refers to screening apparatus of the latter type, wherein the screen is positioned (optically) between the projector and the space intended for an audience, and although this method has advantages over the other method referred to herein, it has one serious disadvantage, in that, owing to the necessary partial transparency of the screen there occurs, almost invariably, an area of intense brightness or "hot-spot" which appears to be on the screen, but which in fact consists of projected rays which pass directly to the viewer's eye without being intercepted or appreciably diffused by the screen.

Objects of this invention are the elimination of the above-mentioned "hot-spot" effect, and the provision of a screening apparatus of the type referred to, wherein an illusion of background depth or distance may be secured in the screened picture, which is different from that subsisting in the actual scene portrayed, and wherein this depth effect may be controllably varied as desired.

Further objects of the invention include the provision of screening apparatus which is of cheap and simple construction, which may be readily dismantled and packed into small compass to facilitate transport thereof, and which enables pictures to be viewed in daylight or artificial light without loss of distinctness and without deterioration of colour values when coloured film projections are screened thereon.

In the accompanying drawing, which is more or less schematic—

Figure 1:
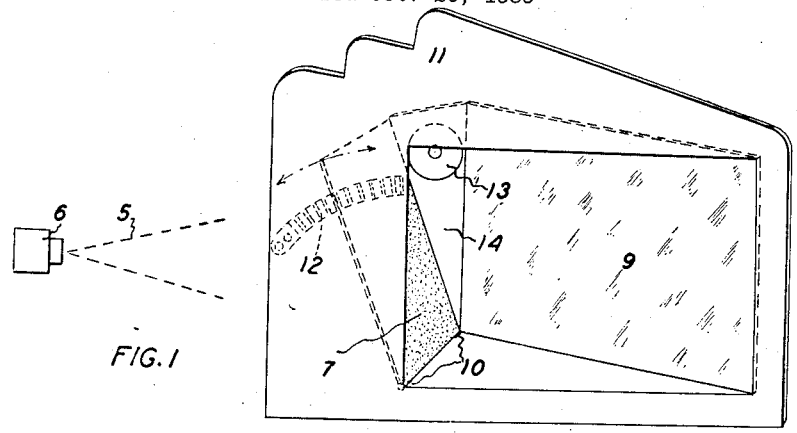
Fig. 1 is a perspective view of one form of the apparatus.
Figure 2:
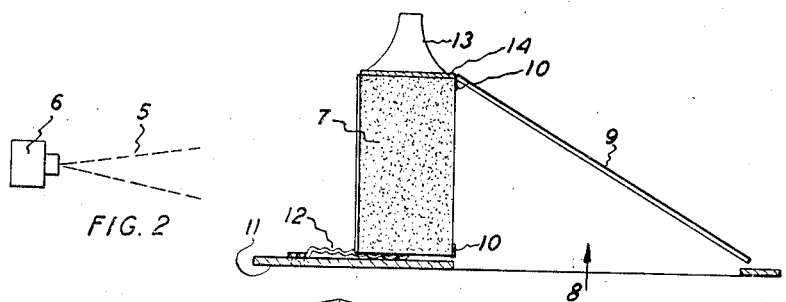
Fig. 2 is a plan of the arrangement shown in Fig. 1.

Referring to Figs. 1 and 2, the light pencil 5 from projector 6 is directed towards the translucent screen 7 whereon an image is materialised and may be viewed by an audience at 8 by reflection in a view mirror 9. The screen 7 is made of glass frosted on one or both sides by sandblasting, etching or otherwise, and said screen is hinged at 10 in order that its inclination to the light pencil may be varied. When the screen is not normal to the axis of projection, the linear scale of the objects defined on the screen progressively diminishes towards that edge of the screen which is closest to the projector, thus giving an illusory background depth effect. It has been found that this effect can be usefully employed, for advertising or amusement purposes for example, to give increased depth or remoteness to the background of the portrayed scene. Means are provided to retain the screen 7 in adjusted position; such means may comprise a row of holes in the proscenium 11, into one of which a peg, whereon the screen may rest, may be inserted. In the arrangement shown, the retaining means comprise a corrugated leaf spring 12 secured to the inner face of the proscenium 11, said spring being in resilient contact with one edge of the screen 7.

A speaker horn 13 on a sounding board 14 may be provided, and if desired, the view mirror 9 may be hinged along its lower edge and supported in the same manner as the screen 7 in order to modify the visual impression received by the audience.

Figure 3:
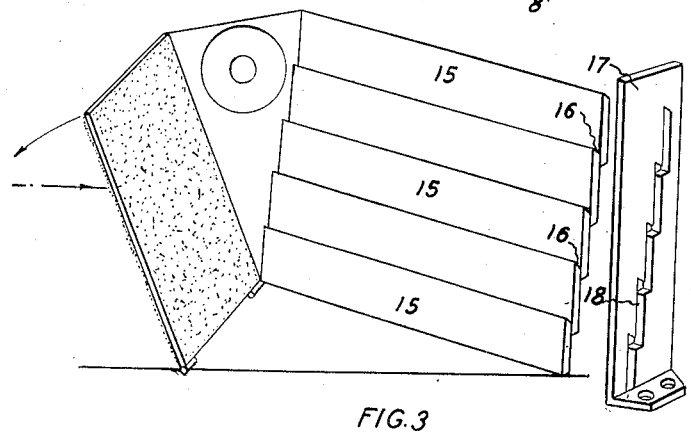
Figs. 3 and 4 are, respectively, views similar to Figs. 1 and 2, of a modified arrangement of the invention.
Figure 4:
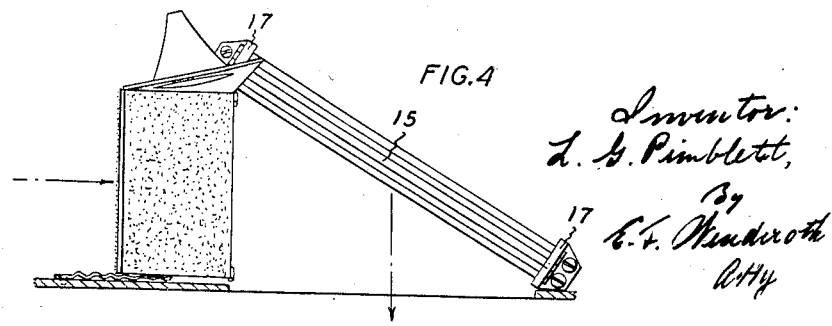

The arrangement shown in Figs. 3 and 4 is similar to that shown in Figs. 1 and 2 with the exception that the view mirror is composed of a plurality of mirror strips 15, all of which preferably have their upper edges rearwardly and downwardly bevelled as indicated at 16. The strips 15 may be supported in any suitable manner, for example by end brackets 17 having slots 18 to receive the ends of the strips 15, similar brackets having differently arranged slots being used where the strips are spaced apart or angularly disposed relative to each other in order to secure modified visual effects.

Although this invention has been described and illustrated with reference to screening apparatus wherein the direction of projection is horizontal, it will be clear that by varying the positions of the view mirror and the screen as a whole, or by the incorporation of an extra mirror whereby the projected light pencil is reflected on to the translucent screen, the direction of projection can be altered according to requirements.

What is claimed is:

A projection apparatus comprising a proscenium, a translucent screen extending normal to the back of said proscenium, means for angularly adjusting said screen about a rotation axis normal to said proscenium in order to vary the illusion of background depth, means for retaining said screen in adjusted position, a view reflector positioned relatively to said screen to reflect an image on said screen in a desired direction towards said proscenium, a sounding board located substantially parallel to said proscenium at the edge of said screen furthest from said proscenium and a loud speaker horn secured to said board.

LEWIS GEORGE PIMBLETT.